United States Patent
Lee et al.

(10) Patent No.: US 8,116,675 B2
(45) Date of Patent: Feb. 14, 2012

(54) METHOD AND APPARATUS FOR HANDOVER BASED ON DYNAMIC BEAMFORMING SCHEME

(75) Inventors: Ji-hoon Lee, Anyang-si (KR); Su-myeon Kim, Suwon-si (KR); Jae-hoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 12/056,541

(22) Filed: Mar. 27, 2008

(65) Prior Publication Data
US 2009/0111469 A1     Apr. 30, 2009

(30) Foreign Application Priority Data
Oct. 24, 2007   (KR) .................. 10-2007-0107446

(51) Int. Cl.
*H04B 7/185* (2006.01)
(52) U.S. Cl. ......... 455/13.3; 455/13.4; 455/68; 370/328
(58) Field of Classification Search .............. 455/13.3, 455/13.4, 68, 69, 225, 434, 436–444, 449, 455/464, 509, 513, 515, 522, 524–525; 370/328, 370/331–334, 338, 341, 436
See application file for complete search history.

(56) References Cited

U.S. PATENT DOCUMENTS

| 6,115,596 | A  | * | 9/2000  | Raith et al. ................. | 455/404.2 |
| 6,330,459 | B1 | * | 12/2001 | Crichton et al. ........... | 455/562.1 |
| 6,571,097 | B1 |   | 5/2003  | Takai | |
| 2001/0006515 | A1 | * | 7/2001 | Lee et al. ................... | 370/331 |
| 2001/0016504 | A1 | * | 8/2001 | Dam et al. .................... | 455/562 |
| 2003/0148765 | A1 | * | 8/2003 | Ma et al. ..................... | 455/438 |
| 2004/0063430 | A1 | * | 4/2004 | Cave et al. .................. | 455/436 |
| 2004/0152465 | A1 | * | 8/2004 | Sanchez ....................... | 455/436 |
| 2004/0192310 | A1 | * | 9/2004 | Karaoguz et al. ........... | 455/440 |
| 2004/0204992 | A1 | * | 10/2004 | Doerwald et al. ............ | 705/14 |
| 2005/0130659 | A1 | * | 6/2005 | Grech et al. ................ | 455/436 |
| 2005/0185610 | A1 | * | 8/2005 | Cheon .......................... | 370/328 |
| 2006/0109817 | A1 | * | 5/2006 | Ramanna et al. ........... | 370/331 |
| 2007/0002813 | A1 | * | 1/2007 | Tenny et al. ................. | 370/338 |
| 2007/0057843 | A1 | * | 3/2007 | Chang et al. ................ | 342/368 |
| 2008/0020770 | A1 | * | 1/2008 | Hofmann ..................... | 455/438 |

FOREIGN PATENT DOCUMENTS

| JP | 06-164434   | 6/1994 |
| JP | 07-170227   | 7/1995 |
| JP | 2000-165321 | 6/2000 |
| KR | 2000-13752  | 3/2000 |
| KR | 2005-57569  | 6/2005 |

(Continued)

*Primary Examiner* — Kamran Afshar
*Assistant Examiner* — Marisol Fahnert
(74) *Attorney, Agent, or Firm* — NSIP Law

(57) ABSTRACT

A method and apparatus for handover based on a dynamic beamforming scheme, which is adapted to a mobile communication system including a mobile node and a base station, is provided. The apparatus includes a mobile profile information processor configured to process mobile profile information based on a location of the mobile node, and to generate a beamforming control signal according to the mobile profile information; a handover indication message processor configured to generate a first handover indication message incorporating the mobile profile information in preparation for a handover of the mobile node; a transceiver configured to transmit the first handover indication message; and a beamforming controller configured to control beamforming for transmission of the transceiver according to the beamforming control signal.

12 Claims, 4 Drawing Sheets

FOREIGN PATENT DOCUMENTS

| | | | | | |
|---|---|---|---|---|---|
| KR | 2005-106656 | 11/2005 | WO | WO 00/31900 | 6/2000 |
| KR | 2006-79877 | 7/2006 | WO | WO 2004/030249 | 4/2004 |

* cited by examiner

METHOD AND APPARATUS FOR HANDOVER BASED ON DYNAMIC BEAMFORMING SCHEME

CROSS-REFERENCE TO RELATED APPLICATIONS

This application claims priority from Korean Patent Application No. 10-2007-0107446, filed on Oct. 24, 2007, the disclosure of which is incorporated herein in its entirety by reference.

BACKGROUND OF THE INVENTION

1. Field of the Invention

The present invention relates to a method and apparatus for handover and, more particularly, to a method and apparatus for handover based on a dynamic beamforming scheme.

2. Description of the Related Art

The mobility of vehicles causes frequent changes in network topology, which leads to frequent interruption of communication paths, resulting in a low-performance network.

SUMMARY OF THE INVENTION

The present invention provides a method and apparatus for handover based on a dynamic beamforming scheme, which makes it possible to configure a network supporting high-speed mobility by performing beamforming based on locations of vehicles.

Additional aspects of the invention will be set forth in the description which follows, and in part will be apparent from the description, or may be learned through experience with the invention.

The present invention discloses an apparatus for handover based on a dynamic beamforming scheme, which is adapted to a mobile communication system including a mobile node and a base station, including: a mobile profile information processor configured to process mobile profile information based on the location of the mobile node and to generate a beamforming control signal according to the mobile profile information; a handover indication message processor configured to generate a first handover indication message incorporating the mobile profile information in preparation for a handover of the mobile node; a transceiver configured to transmit the first handover indication message; and a beamforming controller configured to control beamforming for transmission of the transceiver according to the beamforming control signal.

The present invention also discloses a method for handover based on a dynamic beamforming scheme, which is adapted to a mobile communication system including a mobile node and a base station, including: configuring mobile profile information using location information regarding the mobile node when the mobile node requests a handover; and performing beamforming according to the mobile profile information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
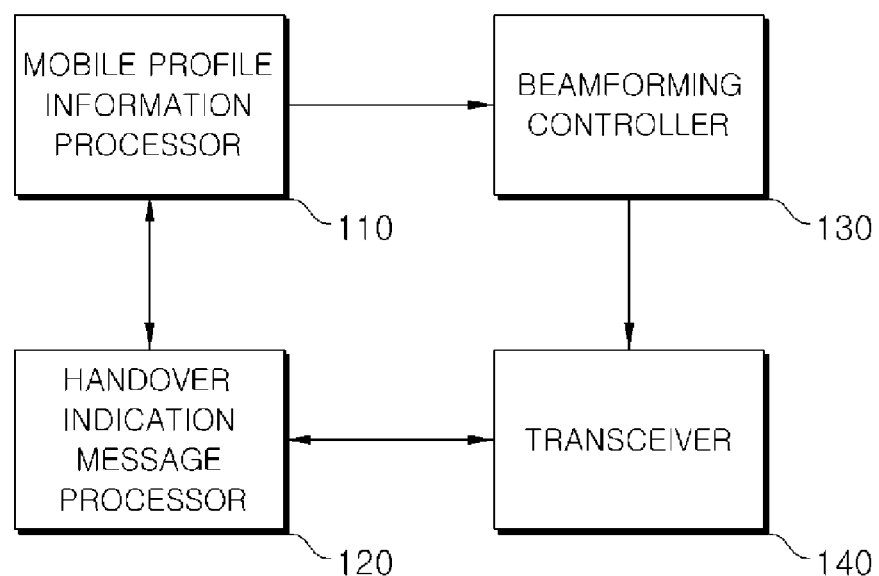
FIG. 1 is a block diagram of an apparatus for handover based on a dynamic beamforming scheme according to an exemplary embodiment of the present invention.

The invention is described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram of an apparatus for handover based on a dynamic beamforming scheme according to an exemplary embodiment of the present invention.

The apparatus for handover using a dynamic beamforming scheme includes a mobile profile information processor 110, a handover indication message processor 120, a beamforming controller 130, and a transceiver 140. The apparatus for handover using a dynamic beamforming scheme may be, but is not limited to, a base station in a mobile communication system which includes a plurality of mobile nodes and a plurality of base stations.

The mobile profile information processor 110 processes mobile profile information using the location of a mobile node, outputs the mobile profile information to the handover indication message processor 120, generates a beamforming control signal according to the mobile profile information, and outputs the beamforming control signal to the beamforming controller 130. The mobile profile information may be, but is not limited to, information stored beforehand in a base station or configured from location information received from a mobile node which is located within the coverage area of the base station. The mobile profile information processor 110 receives a second handover indication message from the handover indication message processor 120, and generates or updates the mobile profile information from the second handover indication message.

The handover indication message processor 120 receives the mobile profile information from the mobile profile information processor 110, generates a first handover indication message incorporating mobile profile information in preparation for a handover of a mobile node, and outputs the first handover indication message to the transceiver 140. The first handover indication message may include, but is not limited to, the locations of other base stations, and the current and estimated locations of a target mobile node. The handover indication message processor 120 receives the second handover indication message from the transceiver 140 and outputs the second handover indication message to the mobile profile information processor 110.

The first handover indication message represents an indication message which a preceding base station transmits to a mobile node and a new base station in a network-initiated scheme. The second handover indication message represents an indication message which a mobile node transmits to a base station in a mobile node-initiated scheme.

The beamforming controller 130 receives a beamforming control signal from the mobile profile information processor 110, and controls a beamforming scheme of the transceiver 140 according to the beamforming control signal. For example, by using the beamforming control signal the beamforming controller 130 can control a smart antenna in the transceiver 140 to generate a directional beam oriented towards the estimated location of a mobile node.

The transceiver 140 receives the first handover indication message from the handover indication message processor 120, generates a directional beam under the control of the beamforming controller 130, and transmits the first handover indication message. In addition, the transceiver 140 may receive the second handover indication message from the mobile node and output it to the handover indication message processor 120. The second handover indication message is generated by the mobile node when the mobile node detects that a handover has occurred. The second handover indication message may include, but is not limited to, the speed of a mobile node and the current and estimated locations of the mobile node.

Figure 2:
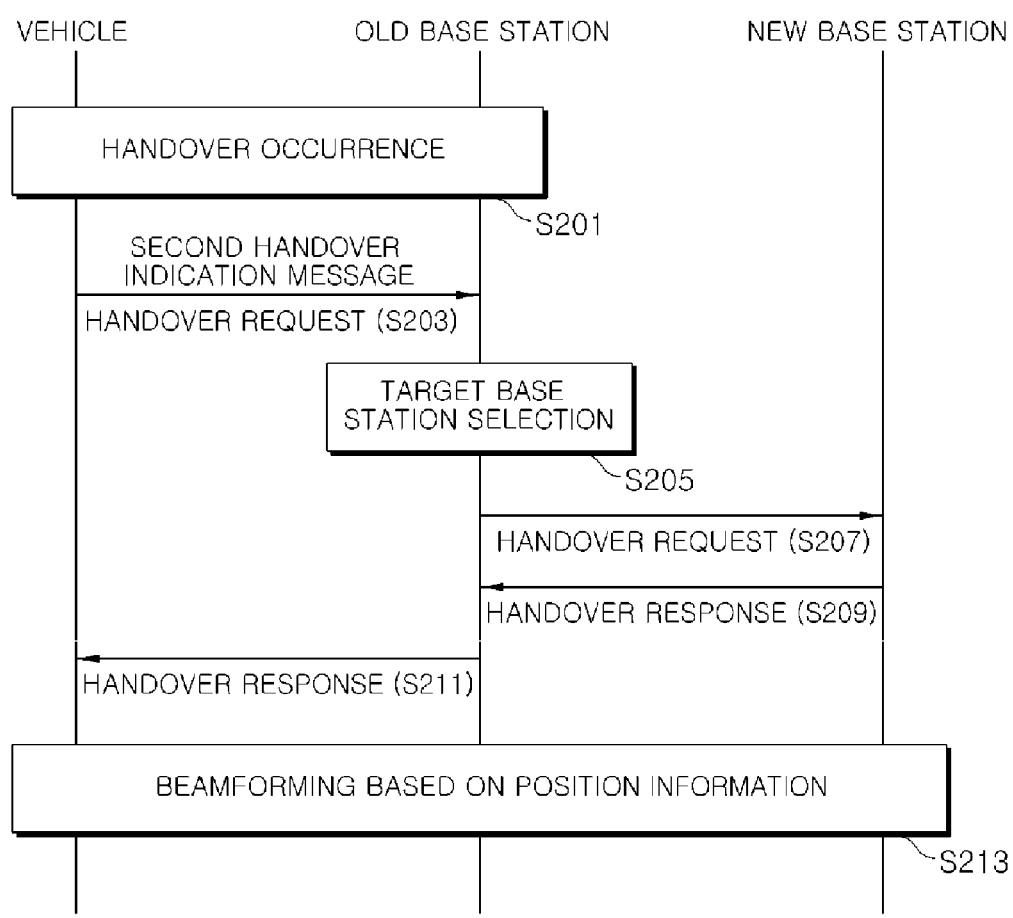
FIG. 2 is a signal flowchart of a mobile-initiated operation of an apparatus for handover based on a dynamic beamforming scheme according to an exemplary embodiment of the present invention.

FIG. 2 is a signal flowchart of a mobile-initiated operation of an apparatus for handover based on a dynamic beamforming scheme according to an exemplary embodiment of the present invention. In FIG. 2, a mobile node is exemplified by a vehicle, and an apparatus for handover based on a dynamic beamforming scheme is exemplified by a base station.

In step S201, a vehicle in motion prepares for a handover as it approaches the boundary of the coverage area of an old base station.

In step S203, the vehicle transmits a second handover indication message to the old base station to request a handover from the old base station. The second handover indication message may include the current speed of the vehicle, and the current and estimated locations of the vehicle. In case of a navigation-equipped vehicle, the estimated location may be obtained from the current speed of the vehicle, destination, and road information.

In step S205, the old base station determines a new base station using the estimated location of the vehicle contained in the second handover indication message. The old base station may use information on locations of neighboring base stations, which are stored beforehand, when determining the new base station.

In step S207, the old base station requests a handover to the new base station determined using the second handover indication message. Upon making the handover request, the current speed of the vehicle and the current and estimated locations of the vehicle, which are contained in the second handover indication message, may be transmitted to the new base station. A mobile profile information processor 110 in the new base station may generate or update mobile profile information using the current speed of the vehicle and the current and estimated locations of the vehicle, which have been received upon making the handover request.

In step S209, the new base station notifies the old base station that it is ready for the handover.

In step S211, the old base station sends to the vehicle a response to the handover request which includes the location information regarding the new base station.

In step S213, the mobile profile information processor 110 in the new base station generates a beamforming control signal using the mobile profile information, and the beamforming controller 130 in the new base station performs adaptive beamforming based on the location information regarding the vehicle according to the beamforming control signal.

Figure 3:
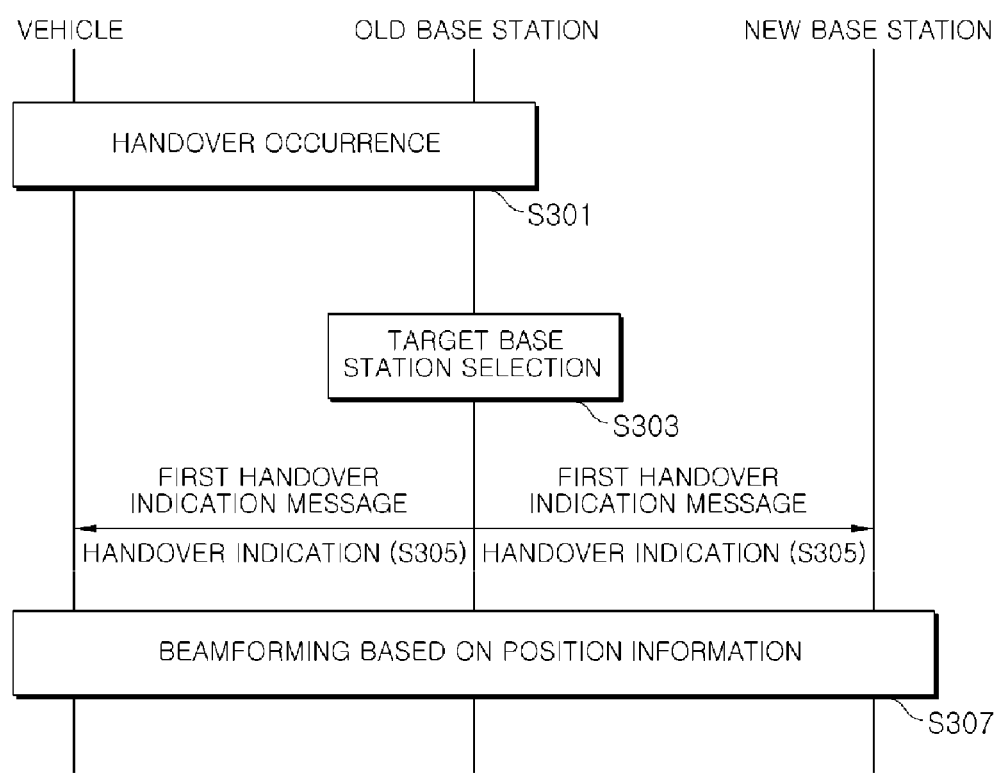
FIG. 3 is a signal flowchart of a network-initiated operation of an apparatus for handover based on a dynamic beamforming scheme according to an exemplary embodiment of the present invention.

FIG. 3 is a signal flowchart of a network-initiated operation of an apparatus for handover based on a dynamic beamforming scheme according to an exemplary embodiment of the present invention. In FIG. 3, a mobile node is exemplified by a vehicle, and an apparatus for handover based on a dynamic beamforming scheme is exemplified by a base station.

In step S301, a vehicle in motion prepares for a handover as it approaches the boundary of the coverage area of an old base station.

In step S303, an old base station determines a new base station using mobile profile information. The mobile profile information may include the current speed of the vehicle, the current and estimated locations of the vehicle, and locations of neighboring base stations which are stored beforehand.

In step S305, the old base station transmits a first handover indication message to the vehicle and the new base station. The first handover indication message transmitted to the vehicle may include location information regarding the new base station, and the first handover indication message transmitted to the new base station may include the current speed of the vehicle and the current and estimated locations of the vehicle.

In step S307, a mobile profile information processor 110 in the new base station incorporates the first handover indication message into mobile profile information and generates a beamforming control signal using the mobile profile information, and a beamforming controller 130 in the new base station performs adaptive beamforming based on the location information regarding the vehicle according to the beamforming control signal.

Figure 4:
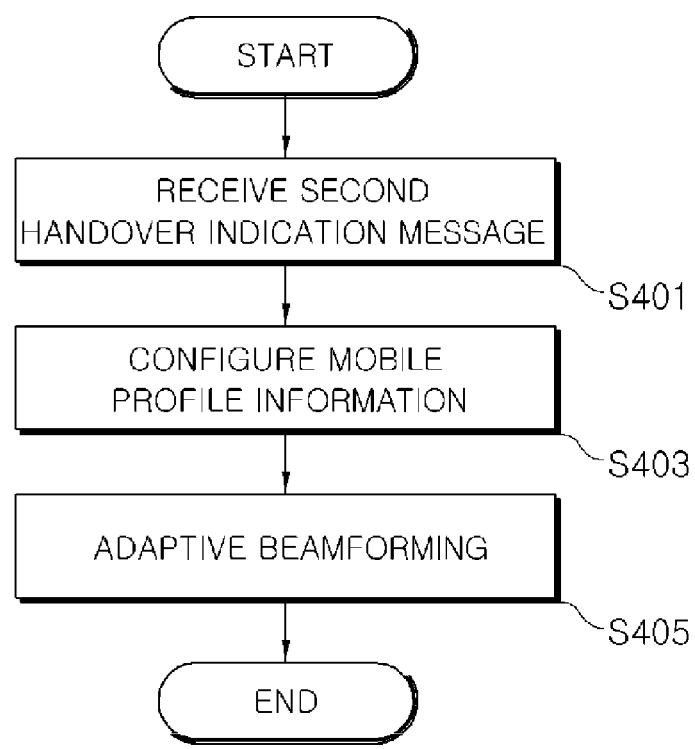
FIG. 4 is a flowchart of a method for handover based on a dynamic beamforming scheme according to an exemplary embodiment of the present invention.

FIG. 4 is a flowchart of a method for handover based on a dynamic beamforming scheme according to an exemplary embodiment of the present invention.

In step S401, the transceiver 140 in the base station receives the second handover indication message from the mobile node and outputs the second handover indication message to the handover indication message processor 120. The second handover indication message is generated by the mobile node when the mobile node detects that a handover has occurred. The second handover indication message may include, but is not limited to, the speed of the mobile node and the current and estimated locations of the mobile node.

In step S403, the mobile profile information processor 110 in the base station receives the second handover indication message from the handover indication message processor 120, and may generate or update mobile profile information using the second handover indication message.

In step S405, the mobile profile information processor 110 generates a beamforming control signal from the mobile profile information based on the location of the mobile node, and the beamforming controller 130 in the base station receives the beamforming control signal from the mobile profile information processor 110 and controls a beamforming scheme of the transceiver 140 according to the beamforming control signal. For example, by using the beamforming control signal the beamforming controller 130 can control a smart antenna in the transceiver 140 to generate a directional beam oriented towards the estimated location of a mobile node.

As apparent from the above description, it is possible to improve the connection between nodes within a network by performing dynamic beamforming and to reduce extra control overhead for dynamic beamforming upon performing a handover.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for handover based on a dynamic beamforming scheme, which is adapted to a mobile communication system including a mobile node and a base station, comprising:
   a mobile profile information processor configured to process mobile profile information based on a location of the mobile node and to generate a beamforming control signal according to the mobile profile information;
   a handover indication message processor configured to generate a first handover indication message incorporating the mobile profile information in preparation for a handover of the mobile node;
   a transceiver configured to transmit the first handover indication message to a new base station; and
   a beamforming controller configured to control beamforming for transmission of the transceiver according to the beamforming control signal,
   wherein the mobile profile information comprises the current speed of the mobile node, the current and estimated locations of the mobile node, and locations of neighboring base stations which are stored beforehand, and
   the first handover indication message is used to process mobile profile information for the new base station, to generate another beamforming control signal on the new base station using the mobile profile information for the new base station and to perform adaptive beamforming according to the beamforming control signal of the new base station.

2. The apparatus of claim 1, wherein the transceiver receives a second handover indication message from the mobile node, the second handover indication message being incorporated in the mobile profile information.

3. The apparatus of claim 2, wherein the second handover indication message comprises current and estimated locations of the mobile node.

4. The apparatus of claim 3, wherein the second handover indication message further comprises a speed of the mobile node.

5. The apparatus of claim 1, wherein the first handover indication message comprises current and estimated locations of the mobile node.

6. The apparatus of claim 5, wherein the first handover indication message further comprises a speed of the mobile node.

7. The apparatus of claim 1, wherein the first handover indication message is transmitted to the mobile node and comprises location information regarding the base station.

8. The apparatus of claim 1, wherein the beamforming control signal is generated using current and estimated locations of the mobile node which are included in the mobile profile information.

9. A method for handover based on a dynamic beamforming scheme, which is adapted to a mobile communication system including a mobile node and a base station, comprising:
   configuring mobile profile information using location information regarding the mobile node when the mobile node requests a handover;
   generating a beamforming control signal according to the mobile profile information; and
   performing beamforming according to the beamforming control signal,
   wherein the mobile profile information comprises the current speed of the mobile node, the current and estimated locations of the mobile node, and locations of neighboring base stations which are stored beforehand.

10. The method of claim 9, further comprising:
    receiving a second handover indication message from the mobile node; and
    updating the mobile profile information using information contained in the second handover indication message.

11. The method of claim 10, wherein the second handover indication message comprises current and estimated locations of the mobile node.

12. The method of claim 11, wherein the second handover indication message further comprises a speed of the mobile node.

* * * * *